US007756200B2

(12) United States Patent
Cohen et al.

(10) Patent No.: US 7,756,200 B2
(45) Date of Patent: Jul. 13, 2010

(54) COMBINING LEAST SQUARES AND LEAST MEAN SQUARES ALGORITHMS TO DETERMINE EQUALIZER TAP VALUES

(75) Inventors: Yossef Cohen, Nesher (IL); Noam Galperin, Ma'alot (IL)

(73) Assignee: Zoran Corporation, Sunnyvale, CA (US)

( * ) Notice: Subject to any disclaimer, the term of this patent is extended or adjusted under 35 U.S.C. 154(b) by 679 days.

(21) Appl. No.: 11/726,780

(22) Filed: Mar. 22, 2007

(65) Prior Publication Data

US 2008/0232453 A1    Sep. 25, 2008

(51) Int. Cl.
 *H03H 7/30* (2006.01)
(52) U.S. Cl. ....................................................... 375/233
(58) Field of Classification Search .......... 375/229–236
 See application file for complete search history.

(56) References Cited

U.S. PATENT DOCUMENTS

| 7,006,564 | B2 | 2/2006 | Ling et al. |
| 7,027,504 | B2 | 4/2006 | Yousef et al. |
| 7,082,174 | B1* | 7/2006 | Smee et al. ................. 375/349 |
| 2005/0259767 | A1 | 11/2005 | Garmany et al. |
| 2006/0029164 | A1 | 2/2006 | Hwang |

OTHER PUBLICATIONS

Ysebaert, Geert et al., "Combined RLS-LMS Initialization for Per Tone Equalizers in DMT-receivers," Proceedings of ICASSP2002, Orlando, Florida, May 2002, pp. 1112537-1112540.

* cited by examiner

*Primary Examiner*—Kevin Y Kim
(74) *Attorney, Agent, or Firm*—Frommer Lawrence & Haug LLP; John W. Branch

(57) ABSTRACT

A method of operating an equalizer includes combining a Least Mean Squares (LMS) algorithm and a Least Squares (LS) algorithm to determine a set of equalizer tap values to be used in processing a signal. A channel impulse response (CIR) is computed, and an equalizer taps interval is then determined based on the CIR. The LS algorithm is used to determine a set of equalizer major taps based on the interval, and the LMS algorithm is used to determine a set of equalizer minor taps based on the interval.

33 Claims, 9 Drawing Sheets

Feed Forward Equalizer

Feed Back Equalizer

COMBINING LEAST SQUARES AND LEAST MEAN SQUARES ALGORITHMS TO DETERMINE EQUALIZER TAP VALUES

TECHNICAL FIELD

At least one embodiment of this invention pertains to the calculation of equalizer tap values, and more particularly, to a combination of Least Squares (LS) and Least Mean Squares (LMS) algorithms to calculate equalizer tap values.

BACKGROUND

In a Digital Television (DTV) system, the signal at the receiver often includes distortions introduced by a transmitter, a transmission channel and/or the receiver itself. Consequently, DTV receivers normally include an equalizer to remove linear distortions. The equalizer may be an adaptive equalizer, i.e., one which employs an equalizer adaptation method that is responsive to the differences ("error information") between the equalizer's output and the transmitted DTV signal. The error information is calculated by subtracting the equalizer output from the received signal. An adaptive equalizer typically has tap values or coefficients.

The DTV signal reception process can be divided into two phases: signal acquisition and signal tracking. During the tracking phase, which is the phase after the system has solidly acquired the DTV signal, equalizer adaptation is "blindly" maintained by the use of Viterbi decoder "soft decisions". Soft-decision Viterbi decoders maintain a history of many possible transmitted sequences, building up a view of their relative likelihoods and finally selecting the value of logic 0 or 1 for each bit according to which has the maximum likelihood. Viterbi soft decisions are typically 8-VSB constellations which are mapped from the corresponding Viterbi decoded bits.

During the acquisition phase, which is the period of time when Viterbi decoder decisions are not yet reliable, a training sequence is often used to initiate the adaptive equalizer. For example, the 8-VSB Advanced Television Systems Committee (ATSC) signal employed by the United States' ATSC digital television system includes a Data Field Sync (DFS) training signal, whose length is 820 symbols. This DFS training signal is repetitively transmitted every 313 DTV segments. Prior art solutions employ the DFS training signal to initiate the adaptive equalizer during the training signal period. However, in the presence of severe multi-path conditions, the training signal period is often too short for the equalizer to converge to a correct solution. This results in an unsuccessful transition between the acquisition phase and the tracking phase using Viterbi decoder soft decisions to drive equalizer adaptation.

One solution implements a Least Mean Squares (LMS) algorithm. This solution includes performing equalizer initialization by employing the LMS algorithm on a training signal, followed by "blind" LMS processing (i.e. without a training signal). Calculations using the LMS algorithm take a long time to converge when strong echoes are present. To allow the LMS algorithm to converge, a low learning rate, which means small incremental steps in each adaptation stage of the LMS algorithm, must be used. However, if these incremental steps are small, the process will never converge when multipath conditions are changed during the calculation. A Recursive Least Squares (RLS) algorithm can also be used to determine equalizer tap values. Examples of an RLS algorithm include Fast Transversal Filter (FTF) method, Fast RLS method and the Fast-Kalman method. Generally these methods, although computationally efficient, suffer from numerical instabilities. However, an RLS algorithm is expensive to implement.

Other methods of initializing equalizer tap values include the use of Reduced Constellation Algorithm (RCA) LMS. This implementation utilizes only the sign of a decision signal from an equalizer, but not the value of the decision signal. The RCA LMS also assumes there is no error in the sign and that the transmitter is using Binary Phase Shift Keying, with only two signal magnitudes.

Calculation of equalizer tap values can also be achieved by implementing a Constant Modulus Algorithm (CMA). This algorithm uses the magnitude of the decision signal, not the sign or phase, of the constellation and assumes the two level constellation is transmitted with different amplitudes. In this case also, the needed information is not in the sign of the decision, but in the amplitude.

One conventional solution divides the equalizer tap values into two groups and utilizes the RLS algorithm. The solution proposes a reduced complexity solution for a feed-forward equalizer (FFE) unit tap values by constraining the length of a feed-back equalizer (FBE) unit. Another solution separates the received multipath echoes into two groups, major and minor equalizer tap values. The method of equalization used to separate the received multipath echoes is a frequency domain filter.

Yet another solution deals with frequency domain equalization for discrete multitone modulation (DMT) or orthogonal frequency-division multiplexing (OFDM) signal. Each frequency domain sub-symbol is equalized by its own "multi-tap" filter. Each filter is updated at each symbol 'k', by using RLS. The idea in this approach is that, in contrast to regular RLS, all the Kalman gain coefficients, except for one, are common for all the filters, and changed only from symbol to symbol. This is like LMS, in which the Kalman gain reduces a constant vector of constant step size. A 'Per Tone Equalizer' (PTEQ) system provides a distinct equalizer for each carrier tone of 256 carriers in a DMT channel. This adaptation initialization scheme for this PTEQ is based on a combination of LMS and RLS, with inverse updating and the equalizer tap values are falling into two categories, tone independent and tone dependent.

None of these solutions, however, provides a desirable balance of fast convergence to a solution and efficient processing resource utilization.

BRIEF DESCRIPTION OF THE DRAWINGS

The present invention is illustrated by way of example, and not by way of limitation, in the figures of the accompanying drawings, in which.

DETAILED DESCRIPTION

Figure 1:
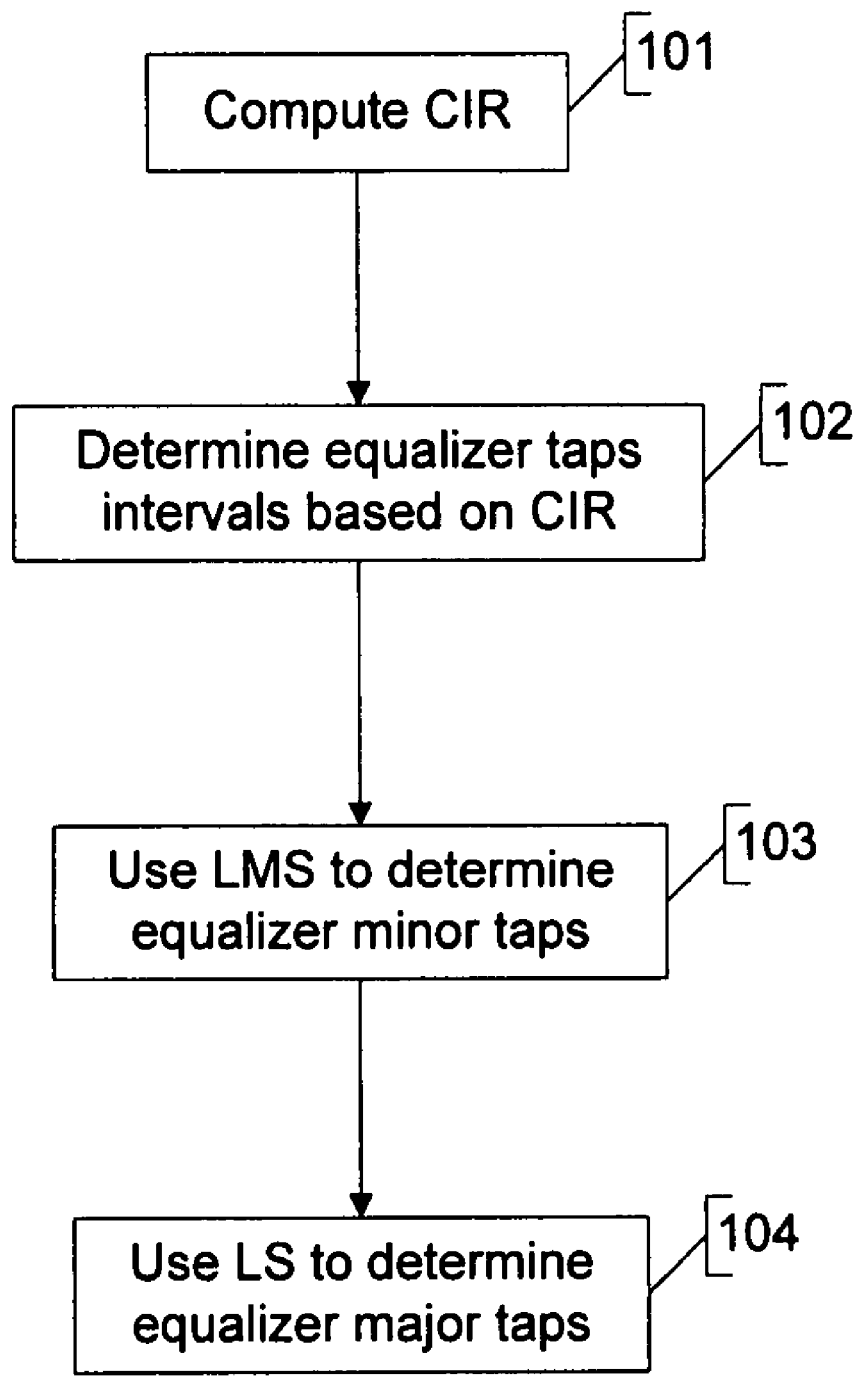
FIG. 1 is a flow diagram illustrating a process of calculating a set of equalizer tap values using both LS and LMS, according to an embodiment of the invention.

A method and apparatus for determining a set of equalizer tap values is described below. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

As described in greater detail below, the technique introduced here includes adapting an equalizer in a VSB receiver during signal acquisition and tracking, including calculating a set of tap values for the equalizer, by applying a combination of a Least Mean Squares (LMS) algorithm and a Least Squares (LS) algorithm. Note that the term LMS as used herein is not intended to refer to any subset, form or implementation of LS; that is, LS and LMS are different types of algorithms, as will be recognized by those of ordinary skill in the art. Contrary to a conventional technique of combining LS and LMS algorithms, the technique introduced here utilizes the outcome of the LMS calculation to constrain the outcome of the LS calculation. This technique allows for quick convergence and fast tracking abilities of the equalizer taps that represent a dominant multipath distortion, without numerical instabilities.

In certain embodiments, this technique includes determining an equalizer taps interval over which to use an LS algorithm, based on a computed channel impulse response (CIR). The LS algorithm can be, for example, an implementation of a Recursive Least Squares (RLS) algorithm or a Block Least Squares (BLS) algorithm. The technique introduced here enables better DTV reception quality in the presence of severe dynamic mutipath reception conditions, such as strong echoes and strong Doppler. Note that while this description focuses on DTV systems, the concept introduced here is not limited to a DTV system.

In certain embodiments of this technique, the CIR is first computed using a well-known technique, and a set of equalizer taps intervals is then determined based on the CIR. The LMS algorithm is used to determine a set of equalizer minor taps based on certain ones of the intervals, and the LS algorithm is used to determine a set of equalizer major taps based on other ones of the intervals and the outcome of the LMS algorithm. The intervals may be defined relative to a maximum CIR coefficient, as described below.

The technique introduced here can be implemented in an equalizer in a DTV receiver. In certain embodiments, as described further below, such an equalizer includes a feed-forward equalizer (FFE) unit, a feedback equalizer (FBE) unit and a Decision unit. The Decision unit is configured to receive a combination of equalized signals output by the FFE unit and the FBE unit. The Decision unit determines a final output signal that couples to the input of the FBE unit and an Equalizer Calculation unit (see FIG. 7).

The Equalizer Calculation unit is configured to perform an LMS calculation and to use an outcome of the LMS calculation to perform an LS calculation. The outcomes of the LS calculation and the LMS calculation are used to determine a set of equalizer tap values for the FBE unit and the FFE unit. The details of this embodiment and other embodiments are also described below.

FIG. 1 is a flow chart illustrating the overall process of calculating a set of equalizer tap values using the technique introduced here. This process can be performed in an equalizer of a receiver during the signal acquisition phase, the signal tracking phase, or both. Initially, in operation 101 the CIR of the equalizer input signal is computed using a well-known technique. Techniques for calculating CIR are well-known in the art and need not be described herein. For example, the CIR solution can be calculated from the training signal received by the receiver and from the training-signal/Viterbi-decisions, by using the LS technique described in Kim J. and Lee Y., "Fast Initialization of Equalizers for VSB-Based DTV Receivers in Multi-path Channel", *IEEE Trans. Comm.*, vol. 51, no. 1, March 2005, which is incorporated herein by reference.

Next, in operation 102 a set of equalizer taps intervals are determined based on the CIR. The intervals may be defined relative to a maximum CIR coefficient, as described below. Then, in operation 103, a form of LMS algorithm is used to determine a set of equalizer minor taps based on certain ones of the equalizer taps intervals, after which a form of the LS algorithm is used to determine a set of equalizer major taps based on other ones of the equalizer taps intervals. The computations in the LS algorithm are based on the results of the LMS algorithm. This process is described in greater detail below.

Figure 2:
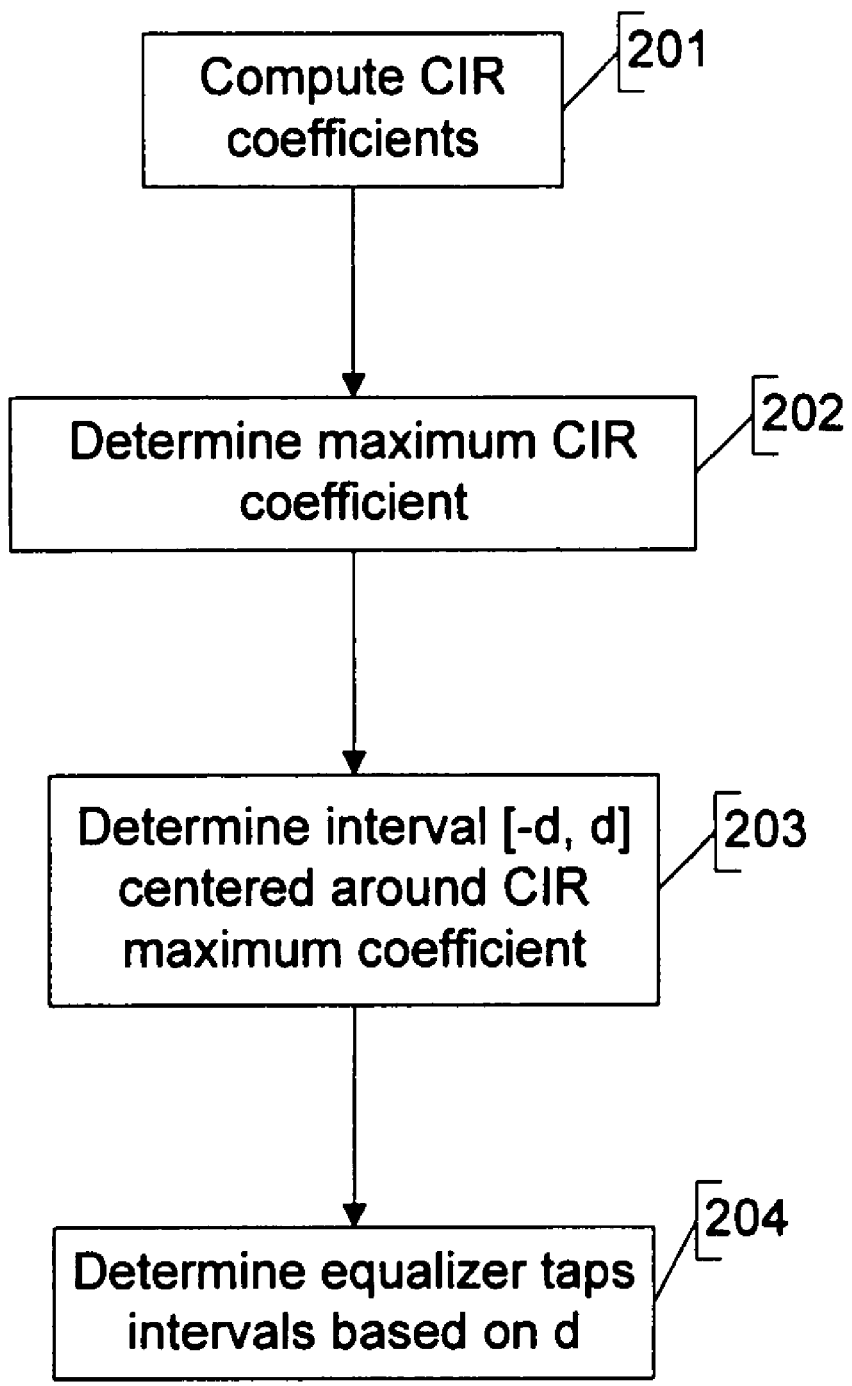
FIG. 2 is a flow chart illustrating operations of computing a channel impulse response (CIR) and a set of equalizer tap intervals.

FIG. 2 shows operations 101 and 102 in greater detail. In operation 201, the set of CIR coefficients is computed for the input signal. Subsequently, in operation 202 the maximum CIR coefficient is identified. Next, in operation 203 an interval [−d, d] is determined, which is centered around the CIR maximum coefficient. In operation 204 the value d in the interval [−d, d] is used to determine the equalizer taps intervals, as described further below.

Figure 4:
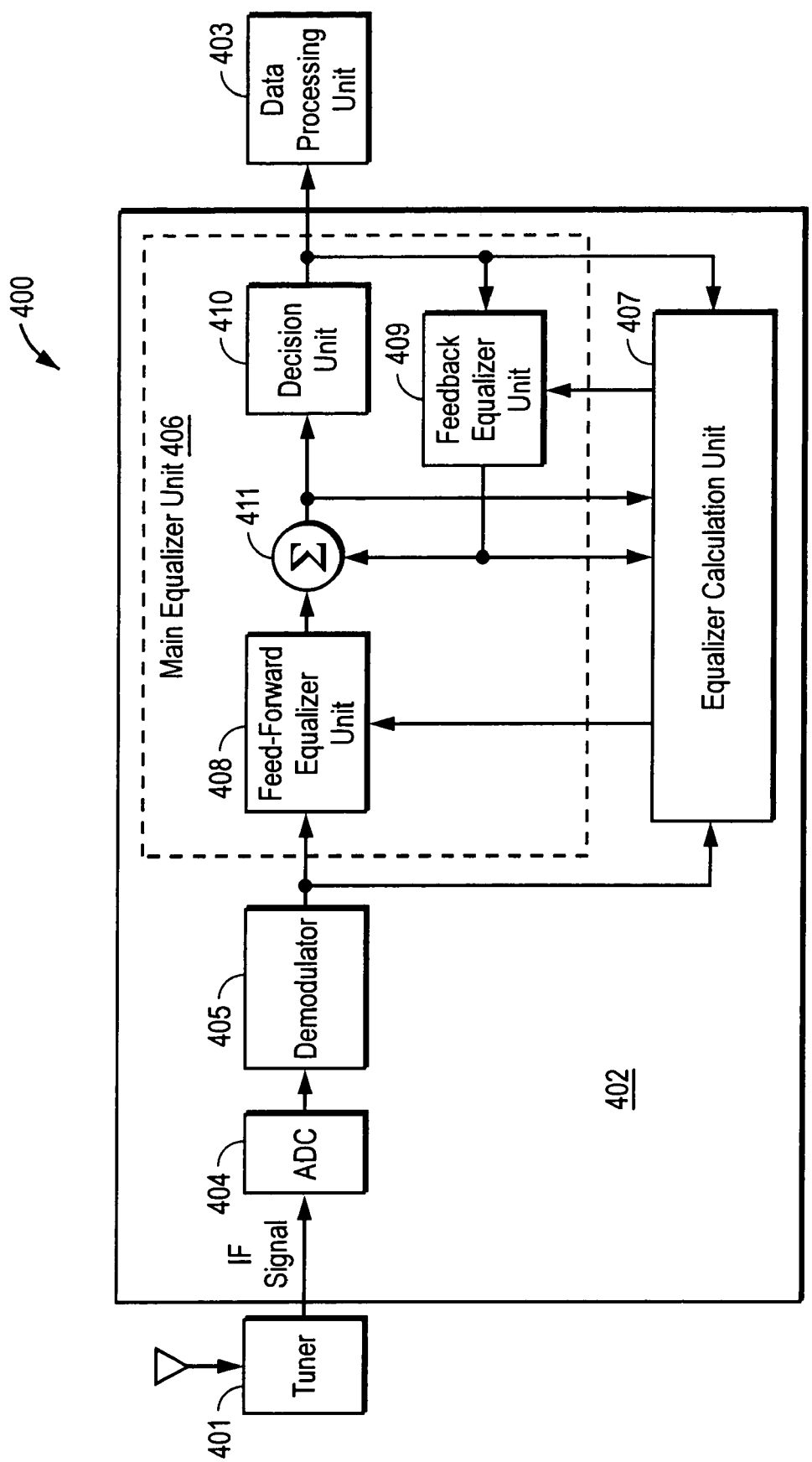
FIG. 4 is a block diagram of a DTV receiver.

The present invention also includes an apparatus, such as a signal receiver or a portion thereof, which can perform the technique introduced here. FIG. 4 illustrates an example of such a receiver. More specifically, FIG. 4 shows an embodiment of a DTV receiver that can implement the technique introduced here.

The receiver 400 includes a tuner 401, a signal processing stage 402, and a data processing stage 403. The tuner 401 receives a DTV signal and converts it to standard intermediate frequency (IF) signal, which is provided to the signal processing stage 402. The signal processing stage 402 performs various types of signal processing, including analog-to-digital conversion, demodulation and adaptive equalization. The output of the signal processing stage 402 is provided to a data processing stage 403, which performs DTV data processing functions that are not germane to the technique introduced here.

The signal processing stage 402 includes an Analog-to-Digital Converter (ADC) 404, a Demodulator 405, a Main Equalizer unit 406, and an Equalizer Calculation unit 407. The ADC 404 receives the IF signal output by the tuner 401 and outputs a digitized version of the signal to the demodulator 405. The demodulated signal output by the demodulator 405 is provided to the Main Equalizer unit 406 and to the Equalizer Calculation unit 407. The output of the Main Equalizer unit 406 is provided to the data processing stage 403.

The Main Equalizer unit 406 includes an FFE unit 408 and an FBE unit 409. The FFE unit 408 and the FBE unit 409 are adapted over time to a dispersive channel through which the data has been transmitted, to correct the inter-symbol interference distorting the transmitted bit-stream due to the channel impulse response. The Main Equalizer unit 406 includes a Decision unit 410 and a summer 411. The Decision unit 410 can be a Viterbi or maximum likelihood decision unit.

The Equalizer Calculation unit 407 described herein includes one or more general-purpose processing devices such as a microprocessor or central processing unit, a microcontroller, or the like. Alternatively, the Equalizer Calculation unit 407 can include one or more special-purpose processing devices such as a digital signal processor (DSP), an application specific integrated circuit (ASIC), a field programmable gate array (FPGA), or the like. In an alternative embodiment, for example, the Equalizer Calculation unit 407 may be a network processor having multiple processors including a core unit and multiple micro-engines. Additionally, the Equalizer Calculation unit 407 can include any combination of general-purpose processing device(s) and special-purpose processing device(s).

Figure 5:
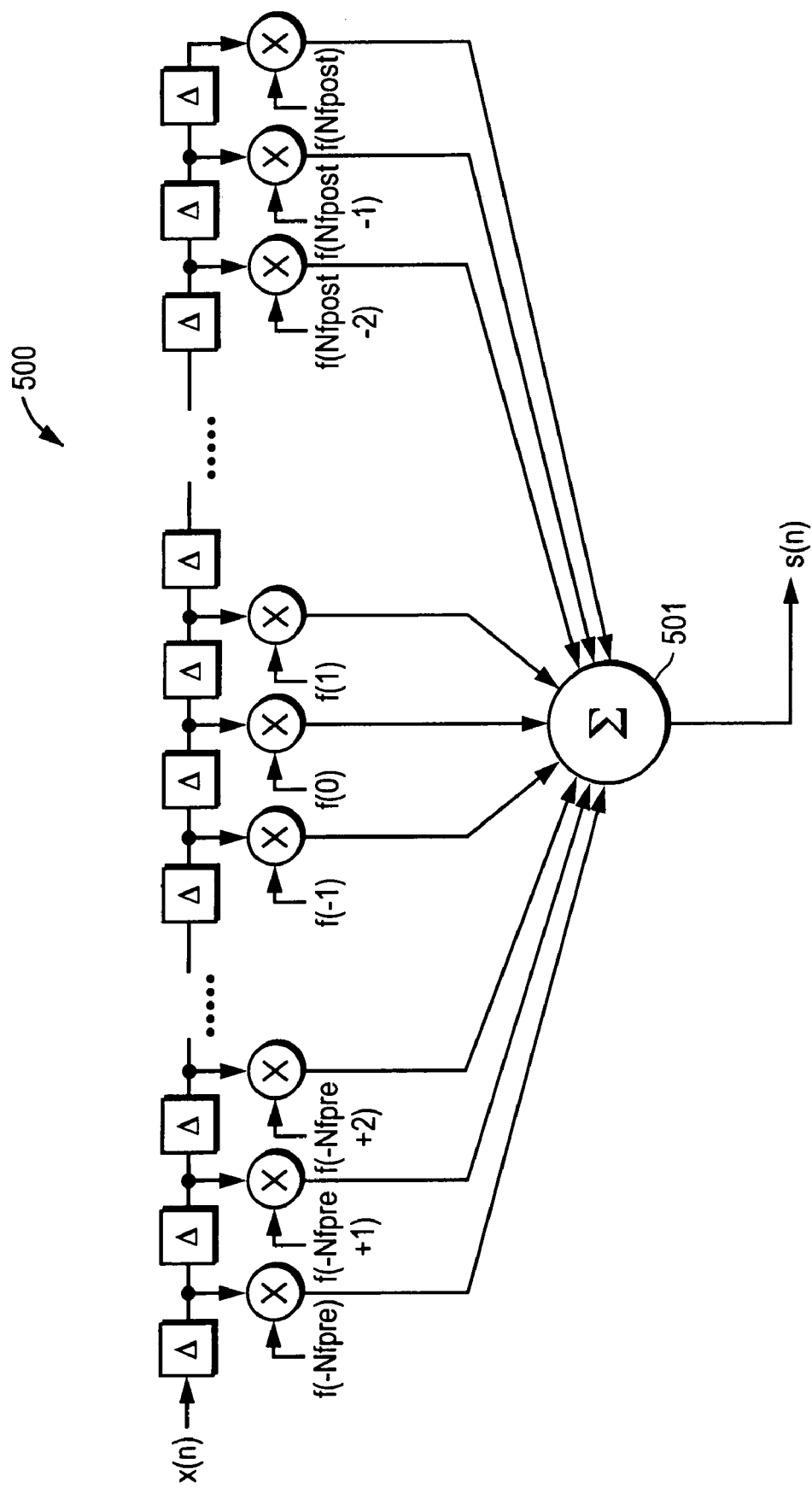
FIG. 5 illustrates one embodiment of a Feed-Forward Equalizer (FFE) unit structure.

FIG. 5 illustrates one embodiment of an FFE unit structure 500, which is representative of the FFE unit 408 in at least one embodiment. In one embodiment, the FFE unit 408 (FIG. 4, described above) is implemented as a Finite Impulse Response (FIR) filter. An input signal x(n) is received by the FFE unit 408. A CIR for the signal x(n) can be calculated as described previously. In this embodiment, there are $N_f$=(Nfpre+Nfpost+1) FFE unit tap values, from f(-Nfpre) to f(Nfpost), provided periodically by an Equalizer Calculation unit 407 (FIG. 4, described above).

where:
Nfpre is the number of FFE taps before the FFE center tap (see FIG. 8); and
Nfpost is the number of FFE taps after the FFE center tap (see FIG. 8).

The FFE unit tap values are applied to a summer 501 resulting in an output signal s(n) from the summer 501.

Figure 6:
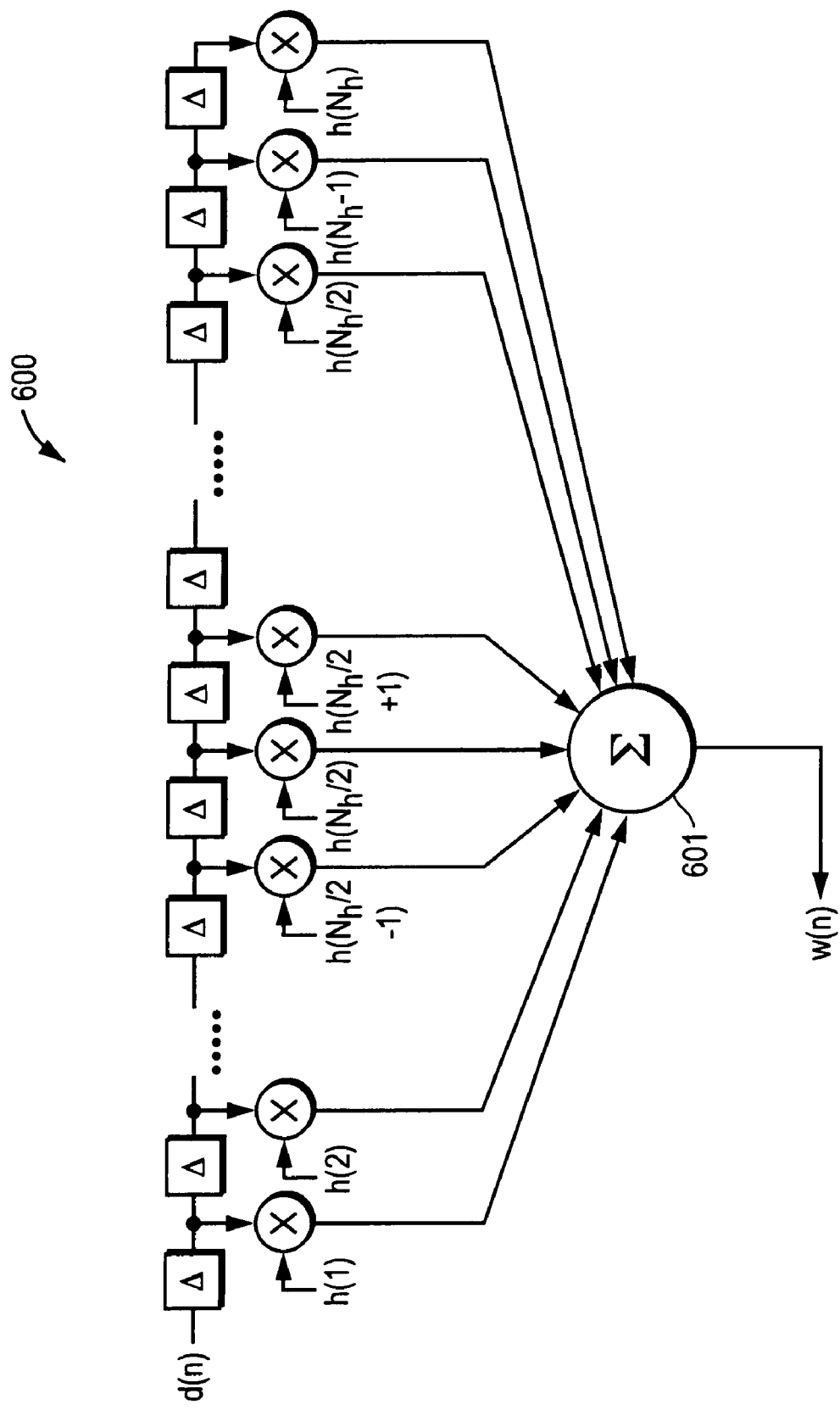
FIG. 6 illustrates one embodiment of a Feed-Back Equalizer (FBE) unit structure.

FIG. 6 illustrates one embodiment of a FBE unit structure 600. An input signal d(n) is received by a FBE unit 409 (FIG. 4, described above). The FBE unit's span is $N_h$ elements, all of which precede a current output symbol. The $N_h$ FBE unit tap values, h(m), from h(1) to h($N_h$), are provided periodically by the Equalizer Calculation unit 407 (FIG. 4, described above). Here, $N_h$ is the number of FBE taps. The FBE unit tap values are applied to a summer 601 that outputs a computed signal, w(n). The error signal e(n) is based on a final output signal y(n) (FIG. 7, described below) and the FBE input signal d(n), where e(n)=d(n)-y(n).

Figure 7:
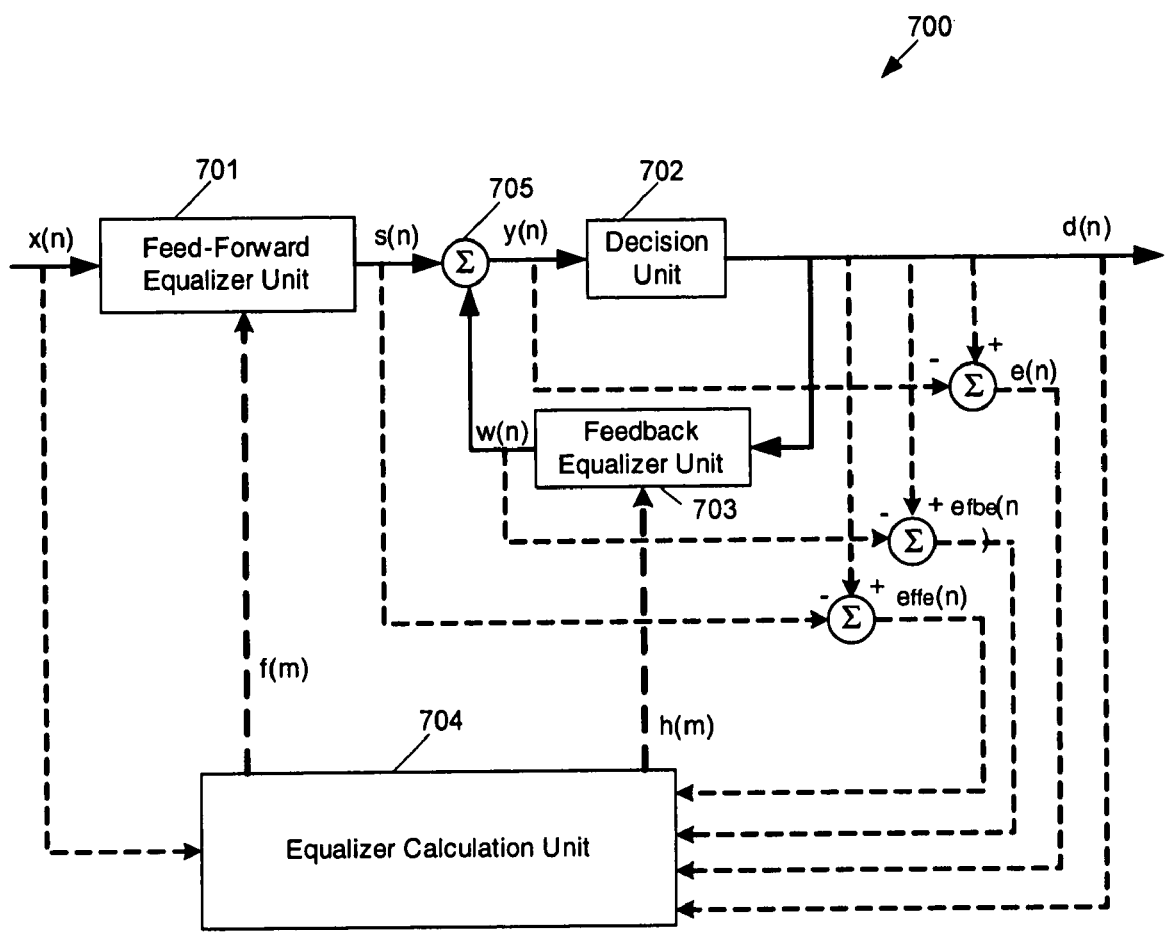
FIG. 7 illustrates one embodiment of an equalizer structure.

FIG. 7 illustrates one embodiment of an equalizer structure, which is representative of the combination of the Main Equalizer unit 406 and the Equalizer Calculation unit 407 in at least one embodiment. The equalizer 700 provides for correction of the dispersion and distortion of a transmission medium. The equalizer 700 includes an FFE unit 701 and an FBE unit 703 such as described above, a Decision Unit 702 as described above, and an Equalizer Calculation unit 704. Raw demodulated data (or an input signal) x(n), from a transmission medium, enters the FFE unit 701 and a fully processed equalized data decision (i.e. the final output signal), d(n), is output from the Decision unit 702, which can be a Viterbi decoder, for example. The output s(n) of the FFE 701 and the output w(n) of the FBE 703 are applied to a summer 705, and the output y(n) of the summer 705 is applied to the Decision unit 702, which determines the final output signal, d(n).

The Equalizer Calculation unit 704 determines the equalizer tap values for the FFE unit 701 and the FBE unit 703 based on an estimate calculation of an error residual signal e(n) (as described in detail below), an FBE error signal $e_{fbe}$(n), and an FFE error signal $e_{ffe}$(n). The equalizer tap values f(m) and h(m) are the equalizer tap values of the FFE unit 701 and the FBE unit 703, respectively. The error residual signal e(n) represents the difference between the decision unit output d(n) and the decision unit input y(n). The FBE error signal $e_{fbe}$(n) is the a posteriori FBE unit error signal representing the difference between the decision unit output d(n) and the FBE output w(n), which is based on the FBE equalizer tap values that were calculated at the previous adaptation-stage. The FFE error signal $e_{ffe}$(n) is the a posteriori FFE unit error signal representing the difference between the decision unit output d(n) and the FFE unit output s(n), which is based on the FFE equalizer tap values that were calculated at the previous adaptation-stage. Note that the Equalizer Calculation unit 704 calculates either e(n), or $e_{fbe}$(n) and $e_{ffe}$(n), depending on the chosen method. The process of computing the tap values is described further below.

The equalizer 700 can be adapted by using, for example, combined LMS-RLS or LMS-BLS techniques, such as introduced herein, that are implemented in the Equalizer Calculation unit 704. The equalizer 700 can be initialized and updated based on a pre-calculated CIR. The LMS algorithm and the RLS or BLS algorithms are used to calculate the major equalizer tap values and the minor equalizer tap values, based on the pre-calculated CIR. The major equalizer tap values are calculated according to the BLS or RLS algorithm, for example, while the minor equalizer tap values are calculated according to the LMS algorithm.

Given the CIR, an interval [-d, d] is determined, which is centered around the CIR maximum coefficient, and the value d of which is determined by the CIR coefficients that exceed some predetermined threshold power level. As d increases, the interval over which LS is used will increase relative to the interval over which LMS is used, thus changing the balance between accuracy and computational expense (LS is more accurate but also more expensive than LMS). Therefore, the threshold power level (which ultimately affects the value of d in the interval [-d, d]) is chosen to achieve the desired balance of accuracy and computational cost.

Figure 3:
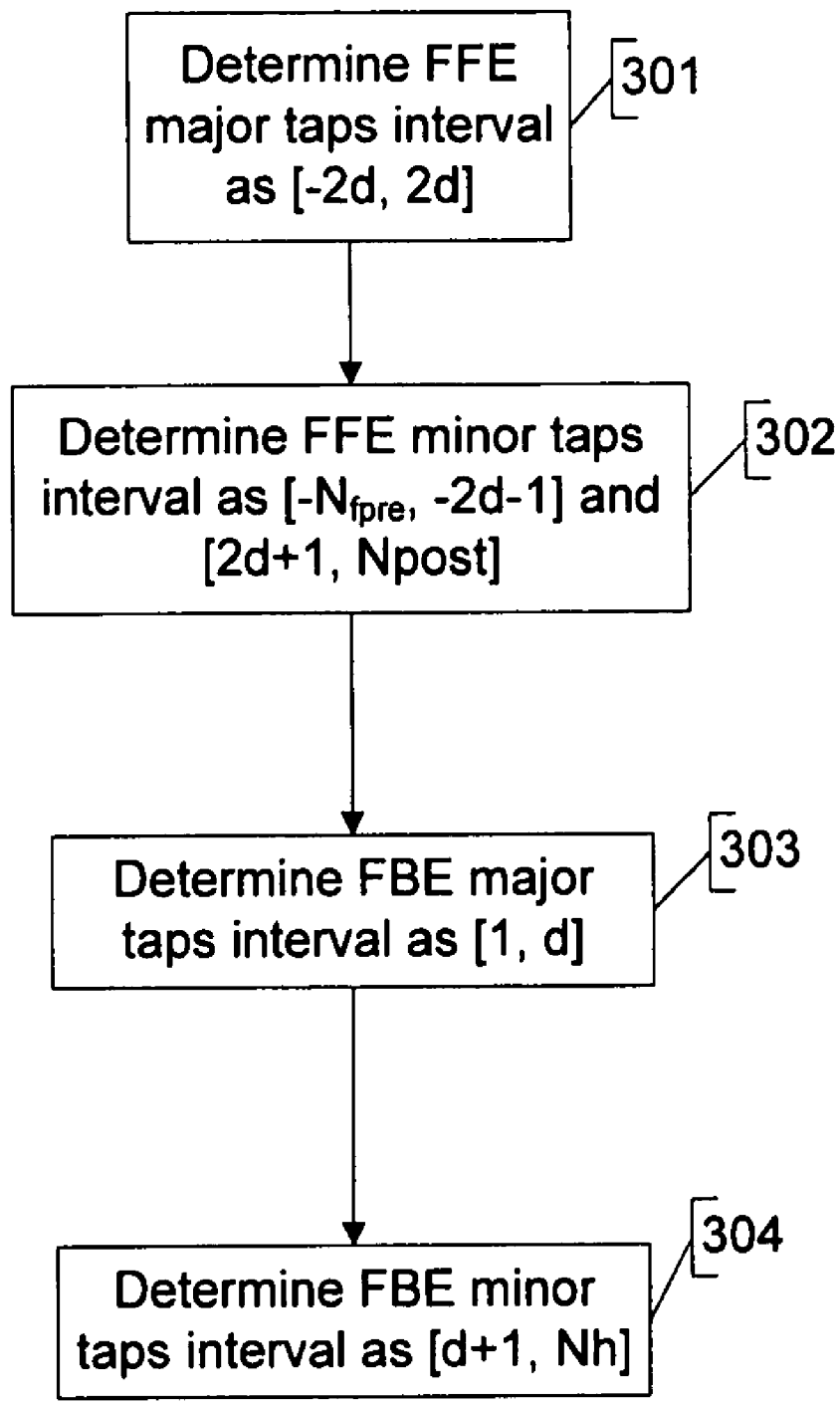
FIG. 3 is a flow chart illustrating operations of computing major and minor equalizer taps intervals.
Figure 8:
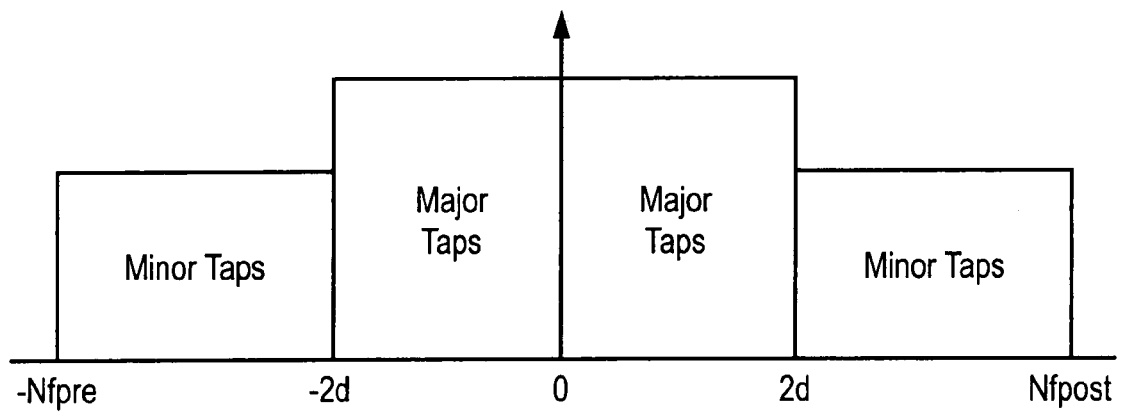
FIG. 8 illustrates a graph showing major and minor tap values of one embodiment of a FFE unit.

Referring to FIGS. 3 and 8, the FFE unit major tap values are defined to be those taps which belong to the interval [-2d, 2d] around the FIR equalizer center tap location (FIG. 3; 301). The FFE unit minor tap values are defined to be those FFE tap values that belong to the intervals [-Nfpre, -2d-1] and [2d+1, Nfpost] (FIG. 3; 302), where:
Nfpre is the number of FFE taps before the FFE center tap (see FIG. 8); and
Nfpost is the number of FFE taps after the FFE center tap (see FIG. 8); and
2d is the range of the strong CIR coefficients.

Note that the order of computations shown in FIG. 3 is not critical.

Figure 9:
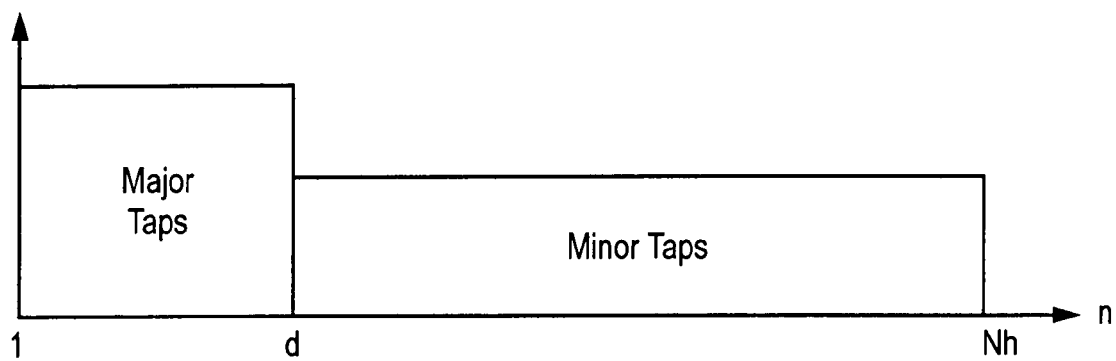
FIG. 9 illustrates a graph showing major and minor tap values of one embodiment of a FBE unit.

As illustrated in FIGS. 3 and 9, the FBE unit major tap values are defined to be those FBE tap values which belong to the interval [1, d] of the equalizer 700 (FIG. 3; 303), while the FBE unit minor tap values are defined to be those FBE tap values which belong to the interval [d+1, Nh] (FIG. 3; 304), where Nh is the number of FBE taps.

The total number of FBE unit and FFE unit tap values, Nh and (Nfpre+Nfpost+1), respectively, are chosen to be large enough to cover the longest expected multi-path cases. The role of the major equalizer tap values is to cancel the strongest channel paths, which are typically located close to the main-path. Therefore, the number of major equalizer tap values can be relatively small, and hence the calculation of the major equalizer tap values by BLS or RLS algorithm consumes relatively small amount of computation effort.

The equalizer tap value calculation process can be built from adaptation-stages. The raw data for each adaptation-stage includes a FFE unit input symbol x(n), a Decision unit input symbol y(n) that is the output of a summer 705 which sums up the equalized output of both the FFE unit 701 and the FBE unit 703, a final output signal which is also a Decision unit output symbol d(n) and an error signal e(n) which is the difference between d(n) and y(n). The time indices n=m*N, m*N+1, m*N+2, . . . , m*N+N−1 constitutes the 'm'-th adaptation-stage, N is the data block size, and "*" is the product operator.

Figure 10:
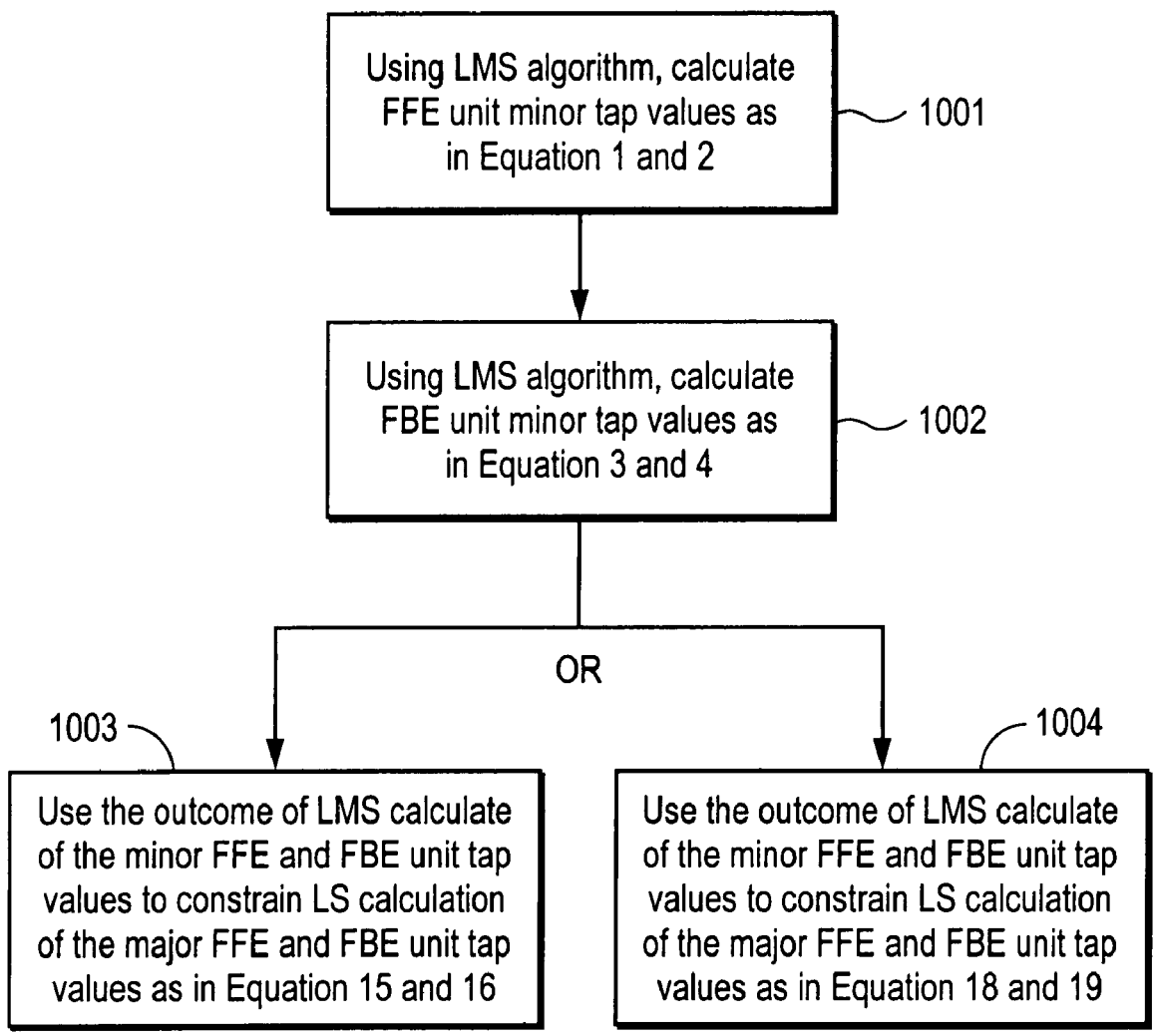
FIG. 10 is a flowchart illustrating the equalizer tap value calculation process built from adaptation-stages.

FIG. 10 is a flowchart illustrating the equalizer tap value calculation process built from adaptation-stages according to an embodiment of the technique introduced here. Each adaptation-stage 'm' includes the calculation of minor equalizer tap values using LMS algorithm and the calculation of major equalizer tap values using BLS or RLS algorithm. In operation 1001 FFE unit minor equalizer tap values are updated by LMS algorithm based on a correlation between e(n) and x(n). The correlation can be expressed using equations 1 and 2:

$$\vec{f}_{LMS}(m) = \vec{f}_{LMS}(m-1) + \mu_f \cdot \vec{p}_{ex}^{LMS} \quad \text{Equation 1}$$

$$\vec{p}_{ex}^{LMS} = \sum_{n=m*N}^{m*N+N-1} \begin{bmatrix} e(n) \cdot x(n), \ldots, \\ e(n) \cdot x(n+2d+1-Nf_{pre}), \\ e(n) \cdot x(n-2d-1-Nf_{pre}), \ldots, \\ e(n) \cdot x(n-Nf_{post}-Nf_{pre}) \end{bmatrix}^T \quad \text{Equation 2}$$

where: $\mu_f$ is the LMS step size corresponding to the FFE unit;
$f_{LMS}(m)$ is the minor FFE unit tap-vector in adaptation 'm'.
$p^{LMS}_{ex}$ is the correlation-vector between e(n) and x(n).
'T' is the transpose vector operation.

In operation 1002, FBE unit minor tap values are updated by a LMS algorithm based on correlation between e(n) and d(n). The correlation can be expressed using equation 3 and 4:

$$\vec{h}_{LMS}(m) = \vec{h}_{LMS}(m-1) + \mu_h \cdot \vec{p}_{ed}^{LMS} \quad \text{Equation 3}$$

$$\vec{p}_{ed}^{LMS} = \sum_{n=m*N}^{m*N+N-1} [e(n) \cdot d(n-1), \ldots, e(n) \cdot d(n-Nh)]^T \quad \text{Equation 4}$$

where: $\mu_h$ is the LMS step size corresponding to the FBE unit;
$h_{LMS}(m)$ is the minor FBE unit tap-vector in adaptation 'm'.
$p^{LMS}_{ed}$ is the correlation-vector between e(n) and d(n).
d(n) is the Decision unit output.

In operation 1003, the calculated minor FFE unit tap values $f_{LMS}(m)$ and minor FBE unit tap values $h_{LMS}(m)$, are used to compute the major FFE unit tap values vector $f_{BLS}(m)$ and the major FBE unit tap values vector $h_{BLS}(m)$, where the major equalizer tap values are calculated using the LS algorithm as illustrated in equation 5.

$$A \cdot \begin{bmatrix} \vec{f}_{BLS}(m) \\ \vec{h}_{BLS}(m) \end{bmatrix} = \vec{b} \quad \text{Equation 5}$$

where $$A = \begin{bmatrix} R_{xx}^{BLS} & R_{xd}^{BLS} \\ R_{dx}^{BLS} & R_{dd}^{BLS} \end{bmatrix} \quad \text{Equation 6}$$

$$\vec{b} = \begin{bmatrix} \vec{p}_{dx}^{BLS} \\ \vec{p}_{dd}^{BLS} \end{bmatrix} - \begin{bmatrix} R_{xx}^{LMS} & R_{xd}^{LMS} \\ R_{dx}^{LMS} & R_{dd}^{LMS} \end{bmatrix} \cdot \begin{bmatrix} \vec{f}_{LMS}(m) \\ \vec{h}_{LMS}(m) \end{bmatrix} \quad \text{Equation 7}$$

Equation 5 can be solved efficiently for the major equalizer taps $f_{BLS}(m)$ and $h_{BLS}(m)$, by using one of various efficient known methods, such as the Cholesky-factorization or the QR-factorization.

The formalization of Equations 5-7 is given below, as follows. The full-dimension correlation and cross correlation matrices $R_{xx}$, $R_{xd} = (R_{dx})^T$ (the transpose of $R_{dx}$), and $R_{dd}$ are defined as follows:

$$R_{xx} = \sum_{n=m*M}^{m*M+N-1} \vec{x}(n) \cdot \vec{x}(n)^T \quad \text{Equation 8}$$

$$R_{xd} = \sum_{n=m*M}^{m*M+N-1} \vec{x}(n) \cdot \vec{\Delta}(n)^T = R_{dx}^T \quad \text{Equation 9}$$

$$R_{dd} = \sum_{n=m*M}^{m*M+N-1} \vec{\Delta}(n) \cdot \vec{\Delta}(n)^T \quad \text{Equation 10}$$

where $$\vec{x}(n) = [x(n), x(n-1), \ldots x(n-N_f)]^T \quad \text{Equation 11}$$

$$\vec{\Delta}(n) = [d(n-1), d(n-2), \ldots d(n-N_h)]^T \quad \text{Equation 12}$$

The full-dimension correlation and cross correlation vectors $\vec{p}_{dx}$ and $\vec{p}_{dx}$ are defined as follows:

$$\vec{p}_{dx} = \sum_{n=m*M}^{m*M+N-1} d(n) \cdot \vec{x}(n) \quad \text{Equation 13}$$

$$\vec{p}_{dd} = \sum_{n=m*M}^{m*M+N-1} d(n) \cdot \vec{\Delta}(n) \quad \text{Equation 14}$$

The matrices $R_{xx}^{BLS}$, $R_{xd}^{BLS} = (R_{dx}^{BLS})^T$, and $R_{dd}^{BLS}$ are sub-blocks of the full dimension matrices $R_{xx}$, $R_{xd}$ and $R_{dd}$, that corresponding to the major taps indices of $f_{BLS}$ and $h_{BLS}$.

In the same manner, the matrices with the superscript "LMS" are sub-blocks of the full dimension matrices $R_{xx}$, $R_{xd}$ and $R_{dd}$, corresponding to the minor taps indices of $f_{LMS}$ and $h_{LMS}$.

The vectors $\vec{p}_{dx}^{BLS}$ and $\vec{p}_{dd}^{BLS}$ are sub-vectors of the full dimension vectors $\vec{p}_{dx}$ and $\vec{p}_{dd}$, that corresponding to the major taps indices of $f_{BLS}$ and $h_{BLS}$.

Note that there is no need to calculate the full dimension matrices/vectors. Based on the definitions above, the major equalizer tap values are satisfied by the following equations:

$$R_{xx}^{BLS}\vec{f}_{BLS}(m) + R_{xd}^{BLS}\vec{h}_{BLS}(m) = \vec{p}_{dx}^{BLS} - R_{xx}^{LMS}\vec{f}_{LMS}(m) - R_{xd}^{LMS}\vec{h}_{LMS}(m) \quad \text{Equation 15}$$

$$R_{dx}^{BLS}\vec{f}_{BLS}(m) + R_{dd}^{BLS}\vec{h}_{BLS}(m) = \vec{p}_{dd}^{BLS} - R_{dx}^{LMS}\vec{f}_{LMS}(m) - R_{dd}^{LMS}\vec{h}_{LMS}(m) \quad \text{Equation 16}$$

where: $f_{BLS}(m)$ and $h_{BLS}(m)$ are the major FFE unit tap values and major FBE unit tap values respectively; the subscript and superscript "BLS" corresponds to shifts related to the indices of the major equalizer tap values; the subscript and superscript "LMS" corresponds to shifts related to the indices of the minor equalizer tap values.

The two systems of equations can be unified into the following matrix form:

$$\begin{bmatrix} R_{xx}^{BLS} & R_{xd}^{BLS} \\ R_{dx}^{BLS} & R_{dd}^{BLS} \end{bmatrix} \cdot \begin{bmatrix} \vec{f}_{BLS}(m) \\ \vec{h}_{BLS}(m) \end{bmatrix} = \begin{bmatrix} \vec{p}_{dx}^{BLS} \\ \vec{p}_{dd}^{BLS} \end{bmatrix} - \begin{bmatrix} R_{xx}^{LMS} & R_{xd}^{LMS} \\ R_{dx}^{LMS} & R_{dd}^{LMS} \end{bmatrix} \cdot \begin{bmatrix} \vec{f}_{LMS}(m) \\ \vec{h}_{LMS}(m) \end{bmatrix} \quad \text{Equation 17}$$

Equation 17 constitutes Equation 5 above.

Alternatively, as illustrated in operation 1004, the major FFE unit tap values $f_{BLS}(m)$ and the major FBE unit tap values $h_{BLS}(m)$ are constrained by the LMS outcomes as illustrated in equations 18 and 19 below. In this embodiment, two low dimension systems of equations are solved rather than a single equation with high dimension as in Equation 5 above. This approach saves computation and furthermore, there is no need to pre-calculate the matrices $R_{xd}^{BLS}$ and $R_{xd}^{LMS}$.

$$R_{xx}^{BLS}\vec{f}_{BLS}(m) = \vec{p}_{ffe} - R_{xx}^{LMS}\vec{f}_{LMS}(m) \quad \text{Equation 18}$$

$$R_{dd}^{BLS}\vec{h}_{BLS}(m) = \vec{p}_{fbe} - R_{dd}^{LMS}\vec{h}_{LMS}(m) \quad \text{Equation 19}$$

where: $p_{ffe}$ and $p_{fbe}$ are cross-correlation vectors, correspond to shifts related to the indices of the major equalizer tap values;

$$\vec{p}_{ffe} = \sum_{n=m*N}^{m*N+N-1} e_{fbe}(n) \cdot \vec{x}(n) \quad \text{Equation 20}$$

$$e_{fbe}(n) = d(n) - \vec{\Delta}^T \cdot \vec{h}(m-1) \quad \text{Equation 21}$$

where: $p_{ffe}$ is particularly the correlation-vector between the input signal $x(n)$ and the a-posteriori FBE unit error signal $e_{fbe}$;
$e_{fbe}$ is based on the FBE equalizer tap values that were calculated at the '(m−1)'-th adaptation-stage.

$$\vec{p}_{fbe} = \sum_{n=m*N}^{m*N+N-1} e_{ffe}(n) \cdot \vec{\Delta}(n) \quad \text{Equation 22}$$

-continued $$e_{ffe}(n) = d(n) - \vec{x}(n)^T \cdot \vec{f}(m-1) \quad \text{Equation 23}$$

where: $p_{fbe}$ is particularly the correlation-vector between the decisions $d(n)$ and the a-posteriori FFE unit error signal $e_{ffe}$;
$e_{ffe}$ is based on the FFE equalizer tap values that were calculated at the '((m−1)'-th adaptation-stage.

The technique introduced above can be implemented in special-purpose hardwired circuitry, in software such as a software program operating within a video signal processor with associated memory, logic and arithmetic subcomponents, or in firmware, or in any combination thereof. Special-purpose hardwired circuitry may be in the form of, for example, one or more application-specific integrated circuits (ASICs), programmable logic devices (PLDs), field-programmable gate arrays (FPGAs), etc. Software or firmware embodying the techniques described above can be executed by one or more programmable general-purpose or special-purpose microprocessors and/or one or more programmable digital signal processors.

Software or firmware to implement the technique introduced here may be stored on a machine-readable medium and may be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-readable medium includes recordable/non-recordable media (e.g., read-only memory (ROM); random access memory (RAM); magnetic disk storage media; optical storage media; flash memory devices; etc.), etc.

Although the operations of the method(s) herein are shown and described in a particular order, the order of the operations of each method may be altered so that certain operations can be performed in an inverse order or so that certain operation can be performed, at least in part, concurrently with other operations. Instructions or sub-operations of distinct operations can be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method of operating an equalizer, the method comprising
   using a least squares (LS) algorithm to calculate a set of major equalizer tap values for the equalizer;
   using a least mean squares (LMS) algorithm to calculate a set of minor equalizer tap values for the equalizer; and
   determining equalizer taps intervals over which to use the LS algorithm and the LMS algorithm.

2. A method as recited in claim 1, wherein said determining equalizer taps intervals comprises:
   calculating a channel impulse response (CIR); and
   determining the equalizer taps intervals based on the CIR.

3. A method as recited in claim 2, wherein said determining the equalizer taps intervals based on the CIR comprises:

determining a plurality of CIR coefficients;
determining a maximum CIR coefficient of the plurality of CIR coefficients;
defining an interval around the maximum CIR coefficient; and
defining the equalizer taps intervals based on said interval.

4. A method as recited in claim 1, wherein said method is performed in the equalizer as part of a signal acquisition phase.

5. A method as recited in claim 1, wherein the LS algorithm comprises a recursive least squares (RLS) algorithm.

6. A method as recited in claim 1, wherein the LS algorithm comprises a block least squares (BLS) algorithm.

7. A method of operating an equalizer, the method comprising:
inputting a signal; and
combining a Least Mean Squares (LMS) algorithm and a Least Squares (LS) algorithm to determine a set of equalizer tap values to be used in processing the signal, including
performing an LMS calculation;
using the outcome of the LMS calculation to constrain the outcome of the LS calculation; and
using the outcome of the LS calculation and the outcome of the LMS calculation to determine the set of equalizer tap values.

8. A method as recited in claim 7, wherein said combining a LMS algorithm and a LS algorithm comprises:
determining equalizer taps intervals over which to use the LS and LMS calculations.

9. A method as recited in claim 7, wherein said method is performed in an equalizer as part of a signal acquisition phase.

10. A method as recited in claim 7, wherein the LS algorithm comprises a RLS algorithm.

11. The method as recited in claim 7, wherein the LS algorithm comprises BLS algorithm.

12. An equalizer comprising:
a Feed Forward Equalizer (FFE) unit to receive an input signal;
a Feed Back Equalizer (FBE) unit;
a Decision unit to receive a combination of equalized signals from the FFE unit and the FBE unit, and to produce a Decision unit output signal based on the combination of equalized signals from the FFE unit and the FBE unit, wherein the Decision unit output signal is coupled to an input of the FBE unit; and
an Equalizer Calculation unit configured to use a Least Squares (LS) calculation to compute a set of major tap values for the FFE unit and the FBE unit and to use a Least Mean Squares (LMS) calculation to compute a set of minor tap values for the FFE unit and the FBE unit.

13. The equalizer of claim 12, wherein the Equalizer Calculation unit is configured to determine equalizer taps intervals over which to use a LS calculation.

14. The equalizer of claim 13, wherein the Equalizer Calculation unit is configured to determine the equalizer taps intervals based on a calculated channel impulse response (CIR).

15. A method as recited in claim 14, wherein the Equalizer Calculation unit is further configured to:
determine a plurality of CIR coefficients;
determine a maximum CIR coefficient of the plurality of CIR coefficients; and
locate the equalizer taps interval around the maximum CIR coefficient.

16. The equalizer of claim 12, wherein the LS calculation comprises a Recursive Least Squares (RLS) calculation.

17. The equalizer of claim 12, wherein the LS calculation comprises a Block Least Squares (BLS) calculation.

18. The equalizer of claim 12, wherein a span of the equalizer is chosen to be greater than a worst expected dispersion of a channel.

19. The equalizer of claim 12, wherein a calculation of a set of major equalizer tap values is according to a BLS calculation.

20. The equalizer of claim 19, wherein the calculation of the set of major equalizer tap values according to a BLS calculation is at specific intervals of a time period, wherein the calculation is based on information collected during the time period.

21. An equalizer comprising:
a Feed Forward Equalizer (FFE) unit configured to receive a signal and configured to output equalized signal;
a Feed Back Equalizer (FBE) unit having an input and an output;
a Decision unit, having an input and an output, wherein the Decision unit is configured to receive a combination of equalized signal output by both the FFE unit and the FBE unit, wherein the Decision unit determines a final output signal that couples to the input of the FBE unit; and
a Equalizer Calculation unit configured to calculate a set of major equalizer taps by using a Least Squares (LS) algorithm and to calculate a set of minor equalizer tap values by using a Least Mean Squares (LMS) algorithm, based on a channel impulse response (CIR).

22. The equalizer of claim 21, wherein the FFE unit comprises a finite impulse response filter.

23. The equalizer of claim 21, wherein the Equalizer Calculation unit is configured to determine intervals over which to use a LS calculation to determine a set of equalizer tap values, based on the CIR.

24. The equalizer of claim 21, wherein the LS calculation comprises a RLS calculation.

25. The equalizer of claim 21, wherein the LS calculation comprises a BLS calculation.

26. The equalizer of claim 25, wherein the calculation of a set of major equalizer tap values according to a BLS calculation is at specific intervals of a time period, wherein the calculation is based on information collected during the time period.

27. The equalizer of claim 21, wherein a span of the equalizer is chosen to be greater than a worst expected dispersion of a channel.

28. The equalizer of claim 21, wherein the Equalizer Calculation unit is configured to determine an estimate of distortion and dispersion of a transmission medium.

29. The equalizer of claim 28, wherein the estimate of the distortion and dispersion of the transmission medium is the CIR.

30. The equalizer of claim 21, wherein the Equalizer Calculation unit updates a set of minor equalizer tap values of the FFE unit according to a LMS calculation based on a correlation between an error of the final output signal and the signal received at the FFE unit, and wherein the Equalizer Calculation unit updates a set of minor equalizer tap values of the FBE unit according to LMS calculation based on a correlation between an error of the final output signal and the output of the Decision unit.

31. The equalizer of claim 21, wherein the Equalizer Calculation unit uses a set of minor equalizer tap values of both the FFE unit and the FBE unit that are updated with a LMS calculation to constrain the outcome of a LS calculation, used to calculate a set of major equalizer tap values of both the FFE unit and FBE unit.

32. A signal receiver comprising:
- a tuner to receive a first signal and to output a second signal based on the first signal;
- a signal processing stage to receive the second signal, the signal processing stage including
  - an analog-to-digital converter to receive the second signal,
  - a demodulator to receive an output of the analog-to-digital converter and to output a demodulated signal, and
  - an equalizer to receive the demodulated signal and to provide signal equalization when the receiver is in the signal acquisition mode and when the receiver is in a signal tracking mode, the equalizer including
    - a Feed Forward Equalizer (FFE) unit configured to receive a signal and configured to output equalized signal;
    - a Feed Back Equalizer (FBE) unit having an input and an output;
    - a Decision unit, having an input and an output, wherein the Decision unit is configured to receive a combination of equalized signal output by both the FFE unit and the FBE unit, wherein the Decision unit determines a final output signal that couples to the input of the FBE unit; and
    - a Equalizer Calculation unit configured to perform and use an outcome of a Least Mean Squares (LMS) calculation to constrain the outcome of a Least Squares (LS) calculation, wherein the combination of the outcome of the LS calculation and the LMS calculation is used to determine a set of equalizer tap values for both the FBE unit and the FFE unit; and
- a data processing stage to receive and process the output of the signal processing.

33. A signal receiver comprising:
- a tuner to receive a first signal and to output a second signal based on the first signal;
- a signal processing stage to receive the second signal, the signal processing stage including
  - an analog-to-digital converter to receive the second signal,
  - a demodulator to receive an output of the analog-to-digital converter and to output a demodulated signal, and
  - an equalizer to receive the demodulated signal and to provide signal equalization when the receiver is in the signal acquisition mode and when the receiver is in a signal tracking mode, the equalizer including
    - a Feed Forward Equalizer (FFE) unit configured to receive a signal and configured to output equalized signal;
    - a Feed Back Equalizer (FBE) unit having an input and an output;
    - a Decision unit, having an input and an output, wherein the Decision unit is configured to receive a combination of equalized signal output by both the FFE unit and the FBE unit, wherein the Decision unit determines a final output signal that couples to the input of the FBE unit; and
    - a Equalizer Calculation unit configured to determine a set of major equalizer tap values and a set of minor equalizer tap values based on a calculated channel impulse response (CIR), by using a Least Squares (LS) algorithm to calculate a set of major equalizer tap values and by using a Least Mean Squares (LMS) algorithm to calculate a set of minor equalizer tap minor equalizer tap values; and
- a data processing stage to receive and process the output of the signal processing.

* * * * *